(12) United States Patent
Shimoya

(10) Patent No.: US 12,325,274 B2
(45) Date of Patent: Jun. 10, 2025

(54) SUSPENSION CONTROL DEVICE

(71) Applicant: TOYOTA JIDOSHA KABUSHIKI KAISHA, Toyota (JP)

(72) Inventor: Naoto Shimoya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/220,349

(22) Filed: Jul. 11, 2023

(65) Prior Publication Data

US 2024/0075783 A1    Mar. 7, 2024

(30) Foreign Application Priority Data

Sep. 2, 2022  (JP) ................ 2022-140153

(51) Int. Cl.
*B60G 17/016* (2006.01)
*B60G 17/018* (2006.01)

(52) U.S. Cl.
CPC .... *B60G 17/016* (2013.01); *B60G 2400/0511* (2013.01); *B60G 2400/0512* (2013.01); *B60G 2400/204* (2013.01)

(58) Field of Classification Search
CPC .............. B60G 17/016; B60G 17/0162; B60G 17/0164; B60G 17/0182; B60G 2400/0511; B60G 2400/0512; B60G 2400/204; B60G 2400/34; B60G 2400/39; B60G 2400/41; B60G 2500/10; B60G 2800/012; B60G 2800/014

USPC .......................................................... 701/38
See application file for complete search history.

(56) References Cited

U.S. PATENT DOCUMENTS

| 5,510,986 A | * | 4/1996 | Williams ........... B60G 17/0182 |
| | | | 701/38 |
| 11,912,091 B2 | * | 2/2024 | Tanzan .............. B60G 17/0162 |
| 2007/0118260 A1 | * | 5/2007 | Gade .................... B60G 17/018 |
| | | | 701/37 |
| 2020/0114721 A1 | * | 4/2020 | Tanzan .............. B60G 17/0157 |
| 2020/0139781 A1 | | 5/2020 | Goto et al. |
| 2022/0024464 A1 | | 1/2022 | Katsuyama |
| 2022/0314729 A1 | | 10/2022 | Isshiki et al. |

FOREIGN PATENT DOCUMENTS

| JP | 2020-075582 A | 5/2020 |
| JP | 2021-119063 A | 8/2021 |
| JP | 2022-021715 A | 2/2022 |

* cited by examiner

*Primary Examiner* — Erick R Solis
(74) *Attorney, Agent, or Firm* — Sughrue Mion, PLLC

(57) ABSTRACT

In a suspension control device, an acquisition unit acquires a target roll moment, a target pitch moment, and a target heave force that are calculated based on a vehicle motion model. A correction unit corrects the target pitch moment based on the target roll moment, and corrects the target heave force based on the target roll moment and the target pitch moment. A warp moment calculation unit calculates a target warp moment based on the target roll moment. A control unit controls a damping force of a suspension of a vehicle, based on the target roll moment, the corrected target pitch moment that is corrected by the correction unit, the corrected target heave force that is corrected by the correction unit, and the target warp moment.

5 Claims, 9 Drawing Sheets

FIG. 1
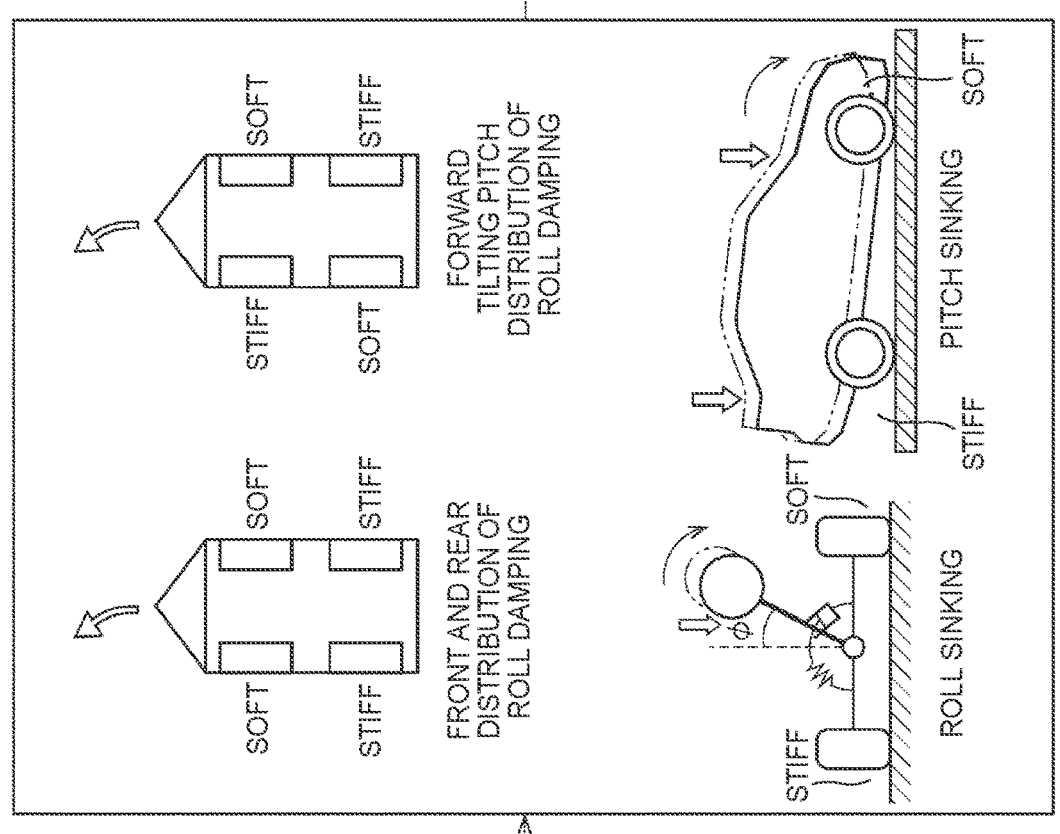
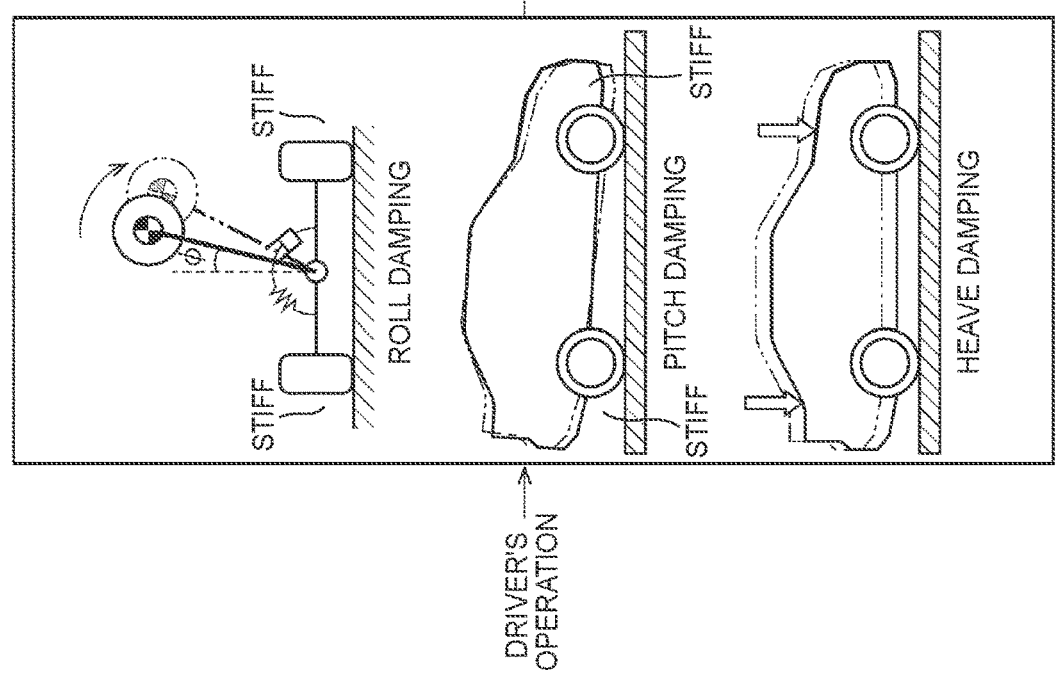

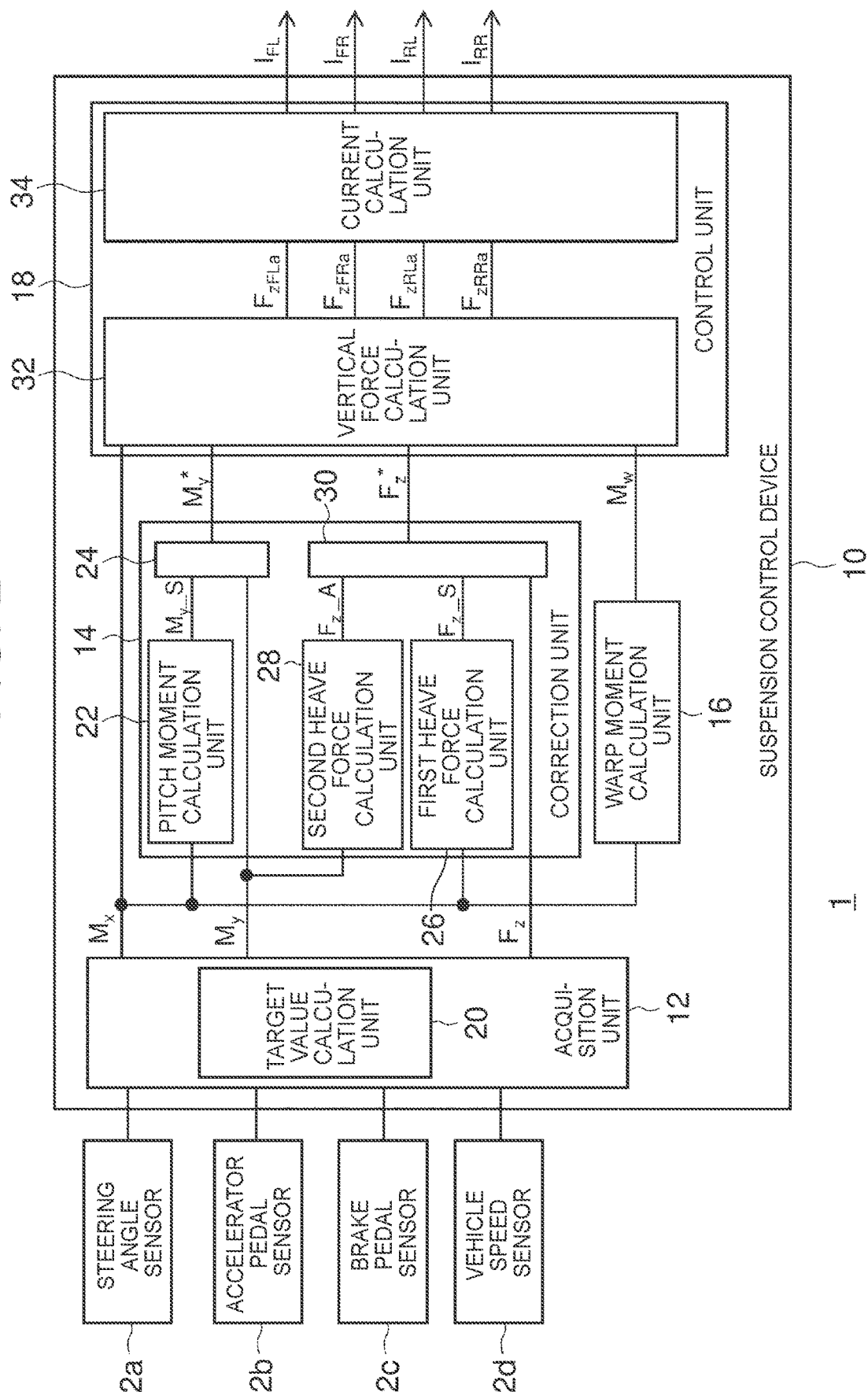

VEHICLE IS STEERED TO LEFT

VEHICLE IS STEERED TO RIGHT

VEHICLE IS DECELERATED

VEHICLE IS ACCELERATED

VEHICLE IS STEERED TO LEFT

VEHICLE IS STEERED TO RIGHT

VEHICLE IS STEERED TO LEFT

VEHICLE IS STEERED TO RIGHT

VEHICLE IS DECELERATED

VEHICLE IS ACCELERATED

VEHICLE IS STEERED TO LEFT

VEHICLE IS STEERED TO RIGHT

SUSPENSION CONTROL DEVICE

CROSS-REFERENCE TO RELATED APPLICATION

This application claims priority to Japanese Patent Application No. 2022-140153 filed on Sep. 2, 2022 incorporated herein by reference in its entirety.

BACKGROUND

1. Technical Field

The present disclosure relates to a suspension control device.

2. Description of Related Art

Japanese Unexamined Patent Application Publication No. 2020-075582 (JP 2020-075582 A) discloses a suspension control device that controls a damping force variable damper. The suspension control device includes: a target pitch moment computation unit configured to compute a pitch moment to be generated in a vehicle body as a target pitch moment, based on a roll rate; a distribution ratio computation unit configured to compute a front and rear distribution ratio, a front right wheel and front left wheel distribution ratio, and a rear right wheel and rear left wheel distribution ratio, based on the roll rate and a vehicle speed; and a damping force computation unit configured to compute a target damping force of the damping force variable damper for each front wheel based on the target pitch moment, the front and rear distribution ratio, and the front right wheel and front left wheel distribution ratio, and to compute a target damping force of the damping force variable damper for each rear wheel based on the target pitch moment, the front and rear distribution ratio, and the rear right wheel and rear left wheel distribution ratio.

SUMMARY

In the technique disclosed in JP 2020-075582 A, pitch characteristics are not controlled with respect to the driver's accelerating/decelerating operation. In addition, heave motion and warp motion during turning become the course and cannot be explicitly designed. Therefore, it is difficult to realize a vehicle posture close to a target posture intended by the designer.

An object of the present disclosure is to provide a suspension control device capable of realizing a vehicle posture close to a target posture.

In order to solve the above issue, a suspension control device according to an aspect of the present disclosure includes: an acquisition unit configured to acquire a target roll moment, a target pitch moment, and a target heave force that are calculated based on a vehicle motion model; a correction unit configured to correct the acquired target pitch moment based on the acquired target roll moment, and correct the acquired target heave force based on the acquired target roll moment and the acquired target pitch moment; a calculation unit configured to calculate a target warp moment based on the acquired target roll moment; and a control unit configured to control a damping force of a suspension of a vehicle, based on the acquired target roll moment, the corrected target pitch moment that is corrected by the correction unit, the corrected target heave force that is corrected by the correction unit, and the calculated target warp moment.

According to the disclosure, the suspension control device that can realize the vehicle posture close to the target posture can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram for schematically illustrating correction of a vehicle posture in a suspension control system according to an embodiment;

FIG. 2 is a diagram showing a configuration of the suspension control system according to the embodiment;

DETAILED DESCRIPTION OF EMBODIMENTS

Figure 3A:
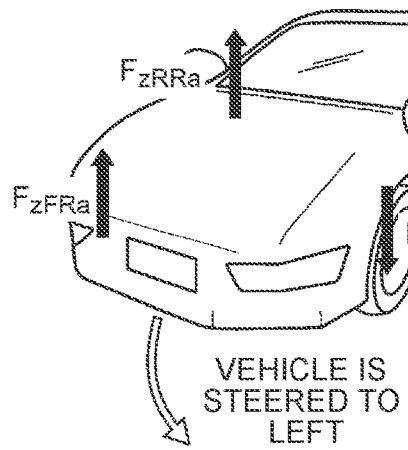
FIG. 3A is a diagram for illustrating an each wheel vertical force that is calculated from a target roll moment.

Before specifically describing an embodiment, the underlying knowledge will be described. A technique is known in which a target roll moment or the like is calculated based on a driver's operation input and a vehicle motion model, and a suspension is controlled based on the calculated target. In the vehicle motion model, for the sake of simplification, roll motion, pitch motion, and heave motion that are sprung three degrees of freedom motion, are often treated independently. This simplification results in coupling motion between the roll motion, the pitch motion, and the heave motion, due to the presence of a modeling error between the vehicle motion model and actual vehicle characteristics. In addition, when the technique is applied to a damping force variable suspension, coupling motion is also caused by, for example, non-linear characteristics of the damping force. When the coupling motion occurs, the vehicle motion differs from the target that is calculated using the vehicle motion model. In addition, there are cases where it is desired to intentionally perform vehicle motion different from the target. Therefore, it is desired to realize a vehicle posture (hereinafter also referred to as a sprung posture) close to a target posture intended by the designer.

Therefore, in the embodiment, the damping force for adjusting the sprung posture of a vehicle during steering and during acceleration and deceleration is distributed to four wheels, and desired roll, pitch, heave, and warp motions are realized by the damping force of the four wheels. As a result, the modeling error described above can be corrected. Also, the vehicle posture close to the target posture can be realized. Even with an actuator having non-linear damping force characteristics, it is possible to easily create a steering posture and an acceleration and deceleration posture close to the designer's aim. In the present disclosure, "when the vehicle is accelerated" indicates when the accelerator is further depressed and a longitudinal jerk (hereinafter referred to as a jerk) of the vehicle becomes positive, and "when the vehicle is decelerated" indicates when the brake is further depressed and the jerk of the vehicle becomes negative.

Hereinafter, an embodiment of the present disclosure will be described in detail with reference to the drawings. In the description, the same elements are denoted by the same signs, and overlapping descriptions are omitted as appropriate.

Focusing on absorber damping characteristics of the suspension, for example, the coupling of the heave motion and the pitch motion to the roll motion of the vehicle is represented by the coupling term within the dashed frame in the following formula (1). Therefore, the sprung posture can be adjusted by distributing the moment and the force that correct the coupling term to the four wheels.

$$\begin{bmatrix} F_z \\ M_y \\ M_x \end{bmatrix} = - \begin{bmatrix} C_{fl}+C_{fr}+ & -(C_{fl}+C_{fr})l_f+ \\ C_{rl}+C_{rr} & (C_{rl}+C_{rr})l_r \\ -(C_{fl}+C_{fr})l_f+ & (C_{fl}+C_{fr})l_f^2+ \\ (C_{rl}+C_{rr})l_r & (C_{rl}+C_{rr})l_r^2 \\ \frac{1}{2}t_f(C_{fl}-C_{fr})+ & -\frac{1}{2}l_ft_f(C_{fl}-C_{fr})+ \\ \frac{1}{2}t_r(C_{rl}-C_{rr}) & \frac{1}{2}l_rt_r(C_{rl}-C_{rr}) \end{bmatrix} \begin{bmatrix} \dot{z} \\ \dot{\theta} \\ \dot{\varphi} \end{bmatrix}$$

formula (1)

In formula (1), $F_z$ is a heave force, $M_y$ is a pitch moment, $M_x$ is a roll moment, $z(\bullet)$ is a heave velocity, $\theta(\bullet)$ is a pitch rate, and $\varphi(\bullet)$ is a roll rate. $z(\bullet)$ indicates that "$\bullet$" is attached above the letter z. The same applies to $\theta(\bullet)$ and $\varphi(\bullet)$. $C_{fl}$ is a damping coefficient of a suspension of a front left wheel, $C_{fr}$ is a damping coefficient of a suspension of a front right wheel, $C_{rl}$ is a damping coefficient of a suspension of a rear left wheel, and $C_{rr}$ is a damping coefficient of a suspension of a rear right wheel. $l_f$ is a distance from the center of gravity to a front wheel axle, $l_r$ is a distance from the center of gravity to a rear wheel axle, $t_f$ is a front wheel tread width, and $t_r$ is a rear wheel tread width.

A four-wheel distribution for suppressing the above-described coupling term is determined as commands to "heave", "pitch", and "warp" with respect to a roll damping target. The warp can be expressed as a front and rear distribution of roll damping. Similarly, the front and rear wheel distribution with respect to the pitch damping target is determined as a command to the "heave".

FIG. 1 is a diagram for schematically illustrating correction of the vehicle posture in a suspension control system according to the embodiment. As shown in FIG. 1, the suspension control system determines target motion based on a vehicle motion model in accordance with a driver's operation that is input (S1). The target motion includes roll damping, pitch damping, and heave damping.

The suspension control system determines the four-wheel distribution of damping based on the determined target motion (S2). For the roll damping target, the four-wheel distribution of the damping is determined as a front and rear distribution of the roll damping, a forward tilting pitch distribution of the roll damping, and roll sinking. For the pitch damping target, the four-wheel distribution of the damping is determined as pitch sinking. With the above, it is determined whether each suspension is to be stiff or soft.

The suspension control system supplies a command value for executing the determined damping distribution to the suspensions of the four wheels (S3).

With a configuration in which the damping is distributed to the four wheels, unintended coupling with the pitch and the heave when the vehicle is steered and when the vehicle is accelerated and decelerated can be corrected, and the gain can be adjusted intuitively on the actual vehicle. It is also possible to intentionally increase the amount of the pitch and the heave when the vehicle is steered and when the vehicle is accelerated and decelerated. Hereinafter, a more specific description will be given.

FIG. 2 shows a configuration of the suspension control system 1 according to the embodiment. The suspension control system 1 is mounted on a vehicle such as a four-wheel automobile, and controls the damping force of the suspension (not shown) of each of the four wheels of the vehicle based on driver input. The driver input includes a driver's accelerator operation, brake operation, and steering. The suspension is, for example, an electronically controlled suspension having a damping force variable shock absorber (hereinafter referred to as an absorber).

The suspension control system 1 includes a steering angle sensor 2a, an accelerator pedal sensor 2b, a brake pedal sensor 2c, a vehicle speed sensor 2d, and a suspension control device 10.

The steering angle sensor 2a detects an operation amount of a steering unit of the vehicle by the driver, and supplies the detected operation amount to the suspension control device 10. The steering unit includes, for example, a steering wheel and a steering shaft. The operation amount of the steering unit includes, for example, a steering angle.

The accelerator pedal sensor 2b is provided on an accelerator pedal of the vehicle, detects an operation amount of the accelerator pedal by the driver, and supplies the detected operation amount to the suspension control device 10. The operation amount of the accelerator pedal is, for example, an amount of depression of the accelerator pedal by the driver.

The brake pedal sensor 2c is provided on a brake pedal of the vehicle, detects an operation amount of the brake pedal by the driver, and supplies the detected operation amount to the suspension control device 10. The operation amount of the brake pedal is, for example, an amount of depression of the brake pedal by the driver.

The vehicle speed sensor 2d detects a vehicle speed of the vehicle and supplies the detected vehicle speed to the suspension control device 10.

The suspension control device 10 controls the damping force of the absorber of each suspension based on the detected operation amount and the detected vehicle speed, thereby controlling the posture of the vehicle. The suspension control device 10 may be constituted by an electronic control unit (ECU). The suspension control device 10 includes an acquisition unit 12, a correction unit 14, a warp moment calculation unit 16, and a control unit 18. The acquisition unit 12 includes a target value calculation unit 20. The correction unit 14 includes a pitch moment calculation unit 22, a first heave force calculation unit 26, a second heave force calculation unit 28, a first addition unit 24, and a second addition unit 30. The control unit 18 includes a vertical force calculation unit 32 and a current calculation unit 34.

A configuration of the suspension control device 10 can be implemented in terms of hardware by a central processing unit (CPU) of any computer, memory, and other large scale integrations (LSIs), and is implemented in terms of software, for example, by a program loaded in the memory, and here, the functional blocks realized by cooperation thereof are illustrated. Therefore, those skilled in the art will understand that the functional blocks can be realized in various forms by hardware only, software only, or a combination thereof.

The acquisition unit 12 acquires a target roll moment $M_x$ acting around a position of the center of gravity of a sprung structure of the vehicle, a target pitch moment $M_y$ acting around the position of the center of gravity, and a target heave force $F_z$ acting on the position of the center of gravity, based on the detected operation amount of the accelerator pedal, the detected operation amount of the brake pedal, the detected steering angle, and the detected vehicle speed.

Specifically, the target value calculation unit 20 calculates the target acceleration/deceleration of the vehicle from the operation amount of the accelerator pedal and the operation amount of the brake pedal. The target acceleration/deceleration can also be referred to as target longitudinal acceleration. The target value calculation unit 20 calculates and acquires the target roll moment $M_x$, the target pitch moment $M_y$, and the target heave force $F_z$, based on the calculated target acceleration/deceleration, the detected steering angle, the detected vehicle speed, and a predetermined vehicle motion model. A known technique can be used to calculate the target roll moment $M_x$ and the like. For example, an absolute value of the target roll moment $M_x$ is greater than zero when the vehicle is steered. An absolute value of the target pitch moment $M_y$ is greater than zero when the vehicle is accelerated and decelerated.

The target value calculation unit 20 may calculate a target vertical force $F_{zij}$ (hereinafter referred to as a target each wheel vertical force $F_{zij}$) at the position of each wheel based on the target acceleration/deceleration, the steering angle, the vehicle speed, and the vehicle motion model, and may calculate the target roll moment $M_x$, the target pitch moment $M_y$, and the target heave force $F_z$ from the target each wheel vertical force $F_{zij}$. Hereinafter, the suffix "ij" of $F_{zij}$ etc. is "FL" representing front left, "FR" representing front right, "RL" representing rear left, or "RR" representing rear right. The formula for calculating the target roll moment $M_x$ from the target each wheel vertical force $F_{zij}$ is shown in formula (2), and the formula for calculating the target pitch moment $M_y$ from the target each wheel vertical force $F_{zij}$ is shown in formula (3), and the formula for calculating the target heave force $F_z$ from the target each wheel vertical force $F_{zij}$ is shown in formula (4).

$$M_x = t_f F_{zFL}/2 - t_f F_{zFR}/2 + t_r F_{zRL}/2 - t_r F_{zRR}/2 \qquad \text{Formula (2)}$$

$$M_y = -l_f(F_{zFL} + F_{zFR}) + l_r(F_{zRL} + F_{zRR}) \qquad \text{Formula (3)}$$

$$F_z = F_{zFL} + F_{zFR} + F_{zRL} + F_{zRR} \qquad \text{Formula (4)}$$

The acquisition unit 12 supplies the acquired target roll moment $M_x$ to the correction unit 14, the warp moment calculation unit 16, and the control unit 18. The acquisition unit 12 supplies the acquired target pitch moment $M_y$ and the target heave force $F_z$ to the correction unit 14. The acquisition unit 12 supplies the acquired vehicle speed to the correction unit 14 and the warp moment calculation unit 16.

The correction unit 14 corrects the target pitch moment $M_y$ supplied from the acquisition unit 12, based on the target roll moment $M_x$ supplied from the acquisition unit 12, and supplies the corrected target pitch moment $M_y^*$ to the control unit 18.

Specifically, the pitch moment calculation unit 22 calculates a value obtained by multiplying the absolute value of the target roll moment $M_x$ by a first gain A, and supplies the obtained value to the first addition unit 24. The value obtained by multiplying the absolute value of the target roll moment $M_x$ by the first gain A is a corrective pitch moment $M_y\_S$ when the vehicle is steered.

The pitch moment calculation unit 22 may set the first gain A in accordance with the vehicle speed acquired by the acquisition unit 12. The correspondence relationship between the vehicle speed and the first gain A is stored in advance as a map in a storage unit (not shown), for example.

The first addition unit 24 outputs a value obtained by adding the calculated corrective pitch moment $M_y\_S$ when the vehicle is steered and the target pitch moment $M_y$ supplied from the acquisition unit 12, as the corrected target pitch moment $M_y^*$.

The correction unit 14 corrects the target heave force $F_z$ supplied from the acquisition unit 12, based on the target roll moment $M_x$ supplied from the acquisition unit 12 and the target pitch moment $M_y$, and supplies the corrected target heave force $F_z^*$ to the control unit 18.

Specifically, the first heave force calculation unit 26 calculates a value obtained by multiplying the absolute value of the target roll moment $M_x$ by a second gain B, and supplies the obtained value to the second addition unit 30. The value obtained by multiplying the absolute value of the target roll moment $M_x$ by the second gain B is the corrective heave force $F_z\_S$ when the vehicle is steered.

The first heave force calculation unit 26 may set the second gain B in accordance with the vehicle speed acquired by the acquisition unit 12. The correspondence relationship between the vehicle speed and the second gain B is also stored in advance as a map in the storage unit (not shown), for example.

The second heave force calculation unit 28 calculates a value obtained by multiplying the target pitch moment $M_y$ by a third gain $\alpha$, and supplies the obtained value to the second addition unit 30. The value obtained by multiplying the target pitch moment $M_y$ by the third gain $\alpha$ is a corrective heave force $F_z\_A$ when the vehicle is accelerated and decelerated.

The second heave force calculation unit 28 sets the third gain $\alpha$ to a first value $\alpha 1$ when the target pitch moment $M_y$ of the vehicle is positive, and sets the third gain $\alpha$ to a second value $\alpha 2$ when the target pitch moment $M_y$ is negative. The first value $\alpha 1$ and the second value $\alpha 2$ may be different or may be the same.

The second addition unit 30 outputs a value obtained by adding the calculated corrective heave force $F_z\_S$ when the vehicle is steered, the calculated corrective heave force $F_z\_A$ when the vehicle is accelerated and decelerated, and the target heave force $F_z$ supplied from the acquisition unit 12, as the corrected target heave force $F_z^*$.

The warp moment calculation unit 16 calculates a target warp moment $M_w$ when the vehicle is steered, based on the target roll moment $M_x$ supplied from the acquisition unit 12, and supplies the calculated target warp moment $M_w$ to the control unit 18. The warp moment calculation unit 16 outputs a value obtained by multiplying the target roll moment $M_x$ by a fourth gain C, as the target warp moment $M_w$.

The warp moment calculation unit 16 may set the fourth gain C in accordance with the vehicle speed acquired by the acquisition unit 12. The correspondence relationship between the vehicle speed and the fourth gain C is also stored in advance as a map in the storage unit (not shown), for example.

The first gain A, the second gain B, the first value $\alpha 1$ and the second value $\alpha 2$ of the third gain $\alpha$, and the fourth gain C can be appropriately determined through experiments or simulations such that a desired vehicle posture can be realized.

The control unit 18 controls the damping force of the suspension of the vehicle based on the target roll moment $M_x$ supplied from the acquisition unit 12, the corrected target pitch moment $M_y^*$ corrected by the correction unit 14, the corrected target heave force $F_z^*$ corrected by the correction unit 14, and the target warp moment $M_w$ calculated in the warp moment calculation unit 16.

Specifically, the vertical force calculation unit 32 calculates a vertical force (hereinafter referred to as an each wheel vertical force $F_{zija}$) at the position of each wheel from the following formulae (5) to (8), based on the target roll moment $M_x$, the corrected target pitch moment $M_y^*$, the corrected target heave force $F_z^*$, and the target warp moment $M_w$. The vertical force calculation unit 32 supplies the calculated each wheel vertical force $F_{zija}$ to the current calculation unit 34.

$$F_{zFLa} = \frac{1}{2}\left(\frac{1}{t_f}M_x - \frac{1}{l}M_y + \frac{l_r}{l}F_z + \frac{1}{t_f}M_w\right) \quad \text{Formula (5)}$$

$$F_{zFRa} = \frac{1}{2}\left(-\frac{1}{t_f}M_x - \frac{1}{l}M_y + \frac{l_r}{l}F_z - \frac{1}{t_f}M_w\right) \quad \text{Formula (6)}$$

$$F_{zRLa} = \frac{1}{2}\left(\frac{1}{t_r}M_x + \frac{1}{l}M_y + \frac{l_f}{l}F_z - \frac{1}{t_r}M_w\right) \quad \text{Formula (7)}$$

$$F_{zRRa} = \frac{1}{2}\left(-\frac{1}{t_r}M_x + \frac{1}{l}M_y + \frac{l_f}{l}F_z + \frac{1}{t_r}M_w\right) \quad \text{Formula (8)}$$

Here, l is the wheelbase. The each wheel vertical force $F_{zija}$ corresponds to the damping force generated in the absorber of each suspension. Hereinafter, an example is described in which the each wheel vertical force $F_{zija}$ that is a positive value is an upward force of the vehicle, that is a force that suppresses the contraction of the absorber, and the each wheel vertical force $F_{zija}$ that is a negative value is a downward force of the vehicle, that is a force that suppresses the expansion of the absorber. It should be noted that the each wheel vertical force $F_{zija}$ that is a negative value may be the upward force of the vehicle.

The current calculation unit 34 calculates a current value $I_{ij}$ for controlling each suspension based on the supplied each wheel vertical force $F_{zija}$, and supplies the calculated current value $I_{ij}$ to the suspension. The absorber of each suspension generates the each wheel vertical force $F_{zija}$ corresponding to the supplied current value $I_{ij}$, as a damping force.

Figure 3B:
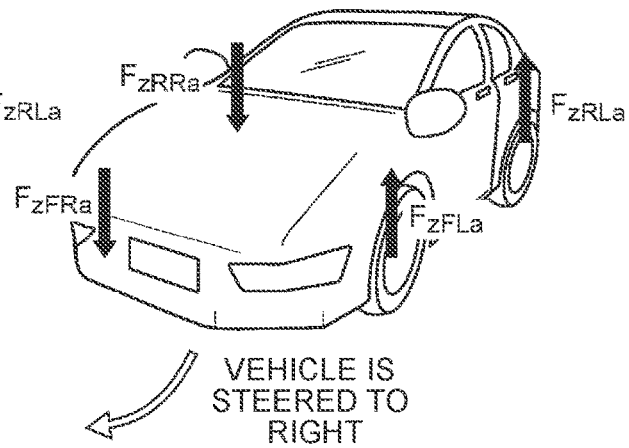
FIG. 3B is a diagram for illustrating the each wheel vertical force that is calculated from the target roll moment.

FIG. 3A and FIG. 3B are each a diagram for illustrating the each wheel vertical force $F_{zija}$ calculated from the target roll moment $M_x$. FIG. 3A shows the each wheel vertical force $F_{zija}$ when the vehicle is steered to the left, and FIG. 3B shows the each wheel vertical force $F_{zija}$ when the vehicle is steered to the right.

A command for the upward each wheel vertical force $F_{zija}$ is sent to the suspension of an outer wheel during turning, and a command for the downward each wheel vertical force $F_{zija}$ is sent to the suspension of an inner wheel during turning, such that target roll damping characteristics are realized, when the vehicle is steered. For example, when the vehicle is steered to the left in FIG. 3A, an each wheel vertical force $F_{zFLa}$ of the front left wheel and an each wheel vertical force $F_{zRLa}$ of the rear left wheel are downward forces, and an each wheel vertical force $F_{zFRa}$ of the front right wheel and an each wheel vertical force $F_{zRRa}$ of the rear right wheel are upward forces. The each wheel vertical forces $F_{zija}$ suppress the roll motion of the vehicle, and realize the target roll damping characteristics.

Figure 4A:
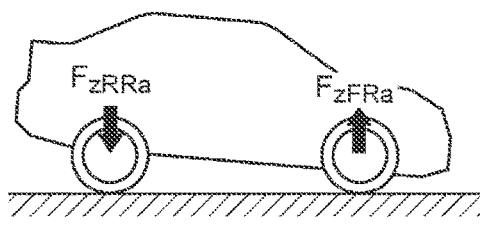
FIG. 4A is a diagram for illustrating the each wheel vertical force that is calculated from a target pitch moment.
Figure 4B:
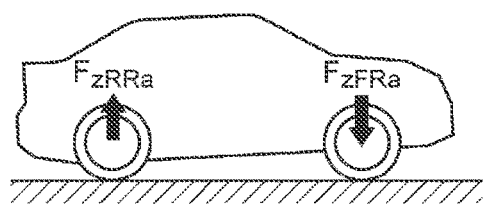
FIG. 4B is a diagram for illustrating the each wheel vertical force that is calculated from the target pitch moment.

FIG. 4A and FIG. 4B are each a diagram for illustrating the each wheel vertical force $F_{zija}$ calculated from the target pitch moment $M_y$. FIG. 4A shows the each wheel vertical forces $F_{zFRa}$, $F_{zRRa}$ of the right wheels when the vehicle is decelerated, and FIG. 4B shows the each wheel vertical forces $F_{zFRa}$, $F_{zRRa}$ of the right wheels when the vehicle is accelerated.

A command for the each wheel vertical force $F_{zija}$ in the direction in which the pitch rate is damped is sent to the suspension of each wheel such that target pitch damping characteristics are realized, when the vehicle is driven or when a braking force is applied to the vehicle. The each wheel vertical forces $F_{zija}$ suppress the pitch motion of the vehicle, and realize the target pitch damping characteristics.

Figure 5A:
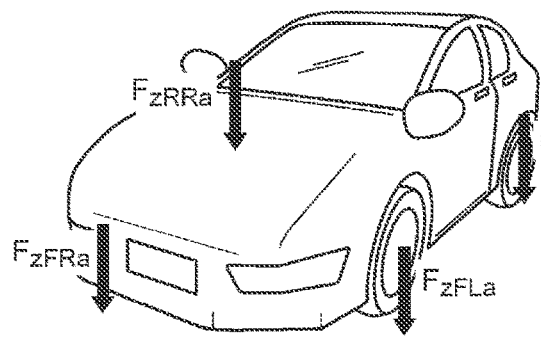
FIG. 5A is a diagram for illustrating the each wheel vertical force that is calculated from a target heave force.
Figure 5B:
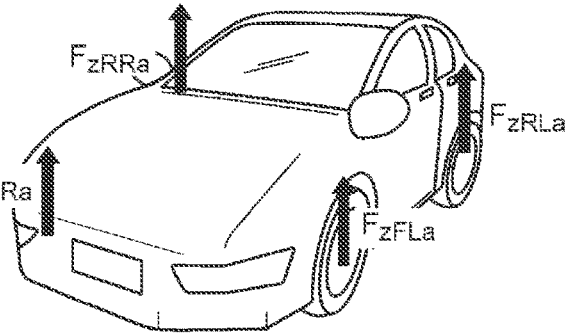
FIG. 5B is a diagram for illustrating the each wheel vertical force that is calculated from the target heave force.

FIG. 5A and FIG. 5B are each a diagram for illustrating the each wheel vertical force $F_{zija}$ calculated from the target heave force $F_z$. FIG. 5A shows the downward each wheel vertical force $F_{zija}$, and FIG. 5B shows the upward each wheel vertical force $F_{zija}$.

A command for the upward or downward each wheel vertical force $F_{zija}$ is sent to the suspension of each wheel such that target heave damping characteristics are realized. The target heave damping characteristics are realized by the each wheel vertical force $F_{zija}$.

Figure 6A:
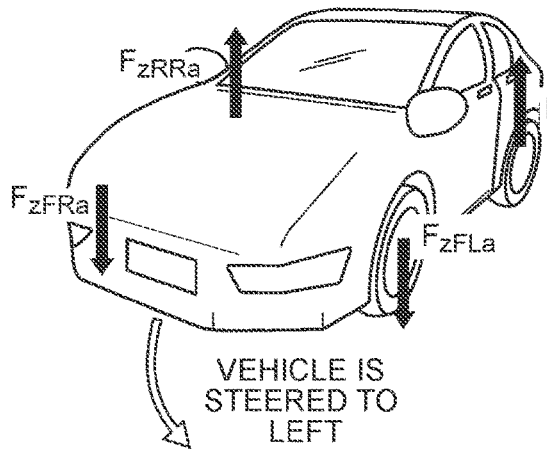
FIG. 6A is a diagram for illustrating the each wheel vertical force that is calculated from a corrective pitch moment when a vehicle is steered.
Figure 6B:
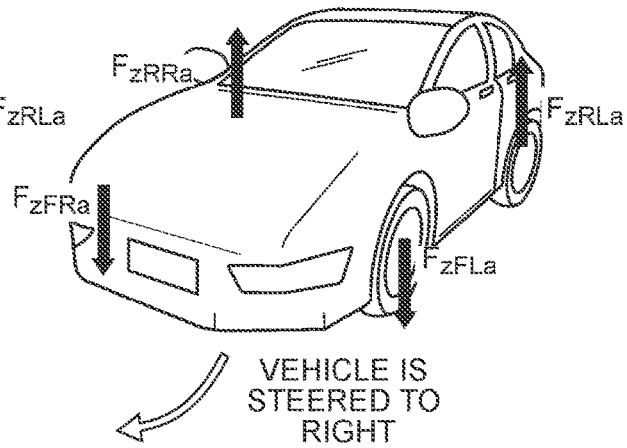
FIG. 6B is a diagram for illustrating the each wheel vertical force that is calculated from the corrective pitch moment when the vehicle is steered.

FIG. 6A and FIG. 6B are each a diagram for illustrating the each wheel vertical force $F_{zija}$ calculated from the corrective pitch moment $M_y\_S$ when the vehicle is steered. FIG. 6A shows the each wheel vertical force $F_{zija}$ when the vehicle is steered to the left, and FIG. 6B shows the each wheel vertical force $F_{zija}$ when the vehicle is steered to the right.

In this example, the first gain A is assumed to be a positive value. Therefore, the corrective pitch moment $M_y\_S$ when the vehicle is steered is a positive value, the corrective pitch moment $M_y\_S$ when the vehicle is steered being the product of the absolute value of the target roll moment $M_x$ and the first gain A. As a result, from the formulae (5) to (8), regardless of the steering direction, the each wheel vertical force $F_{zija}$ on the front wheel side is a downward force, and the each wheel vertical force $F_{zija}$ on the rear wheel side is an upward force.

As described above, when the vehicle is steered, the upward each wheel vertical force $F_{zija}$ is generated on the outer wheel during turning, and the downward each wheel vertical force $F_{zija}$ is generated on the inner wheel during turning, based on the target roll moment $M_x$ (FIG. 3A, FIG. 3B). The each wheel vertical forces $F_{zija}$ shown in FIG. 6A and FIG. 6B are added to these forces.

Thus, for example, when the vehicle is steered to the left in FIG. 6A, the each wheel vertical force $F_{zFLa}$ of the front left wheel in FIG. 3A increases due to correction. Therefore, the force that suppresses the expansion of the absorber of the front left wheel, that is the damping force, is increased due to the correction, and the front left side of the vehicle sinks more than before the correction.

The each wheel vertical force $F_{zFRa}$ of the front right wheel in FIG. 3A decreases due to the correction. Therefore, the force that suppresses the contraction of the absorber of the front right wheel, that is the damping force, is decreased due to the correction, and the front right side of the vehicle sinks more than before the correction.

The each wheel vertical force $F_{zRLa}$ of the rear left wheel in FIG. 3A decreases due to the correction. Therefore, the force that suppresses the expansion of the absorber of the rear left wheel, that is the damping force, is decreased due to the correction, and the rear left side of the vehicle is lifted more than before the correction.

The each wheel vertical force $F_{zRRa}$ of the rear right wheel in FIG. 3A is increased due to the correction. Therefore, the force that suppresses the contraction of the absorber of the rear right wheel, that is the damping force, is increased due to the correction, and the rear right side of the vehicle is lifted more than before the correction.

In this way, the correction causes the vehicle to perform the pitch motion in the forward tilting direction, and the roll motion. The same control is performed when the vehicle is steered to the right. Depending on the magnitude of the first gain A, the magnitude of the pitch motion can be changed. When the first gain A is a negative value, the pitch posture can be controlled to the backward tilting direction due to the correction. Therefore, it is possible to control the transitional pitch posture when the vehicle is steered. The pitch motion due to coupling can be emphasized or suppressed. Also, by setting the first gain A in accordance with the vehicle speed, the vehicle posture can be appropriately controlled in accordance with the vehicle speed.

Figure 7A:
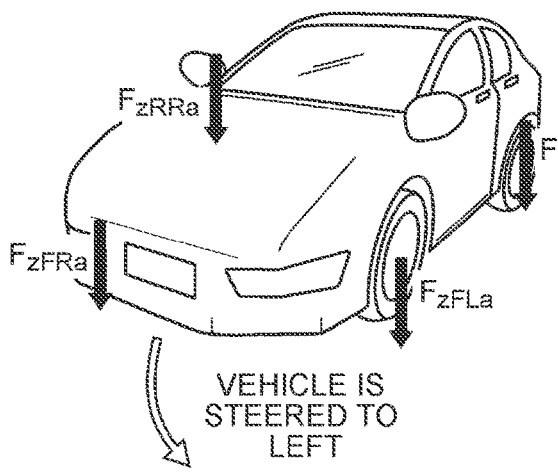
FIG. 7A is a diagram for illustrating the each wheel vertical force that is calculated from a corrective heave force when the vehicle is steered.
Figure 7B:
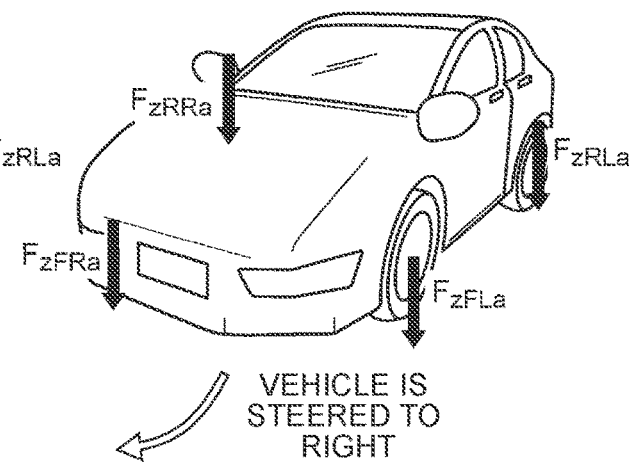
FIG. 7B is a diagram for illustrating the each wheel vertical force that is calculated from the corrective heave force when the vehicle is steered.

FIG. 7A and FIG. 7B are each a diagram for illustrating the each wheel vertical force $F_{zija}$ calculated from the corrective heave force $F_z\_S$ when the vehicle is steered. FIG. 7A shows the each wheel vertical force $F_{zija}$ when the vehicle is steered to the left, and FIG. 7B shows the each wheel vertical force $F_{zija}$ when the vehicle is steered to the right.

In this example, the second gain B is assumed to be a negative value. Therefore, the corrective heave force $F_z\_S$ when the vehicle is steered is a negative value, the corrective heave force $F_z\_S$ when the vehicle is steered being the product of the absolute value of the target roll moment $M_x$ and the second gain B. As a result, from the formulae (5) to (8), regardless of the steering direction, the each wheel vertical force $F_{zija}$ is a downward force. In this way, the sign of the second gain B may be determined in advance such that the corrective heave force $F_z\_S$ when the vehicle is steered represents the downward force of the vehicle.

As described above, when the vehicle is steered, the upward each wheel vertical force $F_{zija}$ is generated on the outer wheel during turning, and the downward each wheel vertical force $F_{zija}$ is generated on the inner wheel during turning, based on the target roll moment $M_x$ (FIG. 3A, FIG. 3B). The each wheel vertical forces $F_{zija}$ shown in FIG. 7A and FIG. 7B are added to these forces.

Thus, for example, when the vehicle is steered to the left in FIG. 7A, the each wheel vertical force $F_{zFLa}$ of the front left wheel and the each wheel vertical force $F_{zRLa}$ of the rear left wheel in FIG. 3A each increase due to the correction. Therefore, the force that suppresses the expansion of the absorber of each of the front left wheel and the rear left wheel, that is the damping force, is increased due to the correction, and the left side of the vehicle sinks more than before the correction.

The each wheel vertical force $F_{zFRa}$ of the front right wheel and the each wheel vertical force $F_{zRRa}$ of the rear right wheel in FIG. 3A each decrease due to the correction. Therefore, the force that suppresses the contraction of the absorber of each of the front right wheel and the rear right wheel, that is, the damping force, is decreased due to the correction, and the right side of the vehicle sinks more than before the correction.

In this way, the right and left distribution ratio of the damping when the vehicle is steered can be adjusted, and due to the correction, the vehicle sinks overall and performs the roll motion. That is, the vehicle can be sunk when the vehicle is steered. The same control is performed when the vehicle is steered to the right. Depending on the magnitude of the second gain B, an amount by which the vehicle sinks can be changed. Also, by setting the second gain B in accordance with the vehicle speed, the vehicle posture can be appropriately controlled in accordance with the vehicle speed.

Further, when the second gain B is a positive value, due to the correction, the vehicle is lifted overall and performs the roll motion. Therefore, when designing the vehicle, it is possible to adjust whether to lift the vehicle or to sink the vehicle while the roll motion is performed when the vehicle is steered. That is, the heave motion due to coupling can be emphasized or can be suppressed.

Figure 8A:
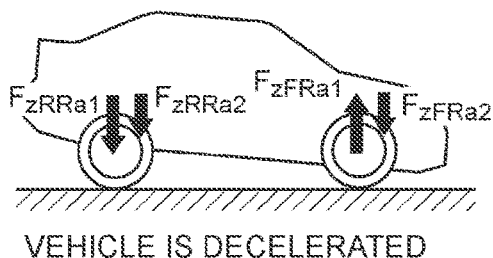
FIG. 8A is a diagram for illustrating the each wheel vertical force that is calculated from a corrective heave force when the vehicle is decelerated.
Figure 8B:
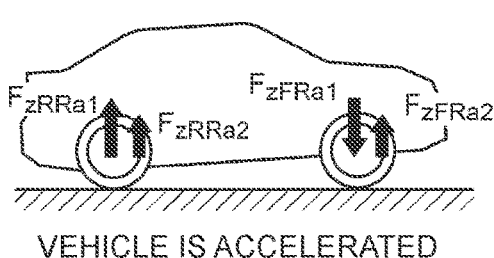
FIG. 8B is a diagram for illustrating the each wheel vertical force that is calculated from a corrective heave force when the vehicle is accelerated.

FIG. 8A and FIG. 8B are each a diagram for illustrating the each wheel vertical force $F_{zija}$ (hereinafter referred to as an each wheel vertical force $F_{zija2}$) calculated from a corrective heave force $F_z\_A$ when the vehicle is accelerated and decelerated. FIG. 8A shows the each wheel vertical forces $F_{zFRa2}$, $F_{zRRa2}$ of the right wheels when the vehicle is decelerated, and FIG. 8B shows the each wheel vertical forces $F_{zFRa2}$, $F_{zRRa2}$ of the right wheels when the vehicle is accelerated.

As described above, the upward each wheel vertical force $F_{zija}$ (hereinafter referred to as an each wheel vertical force $F_{zija1}$) is generated on the front wheel, and the downward each wheel vertical force $F_{zija1}$ is generated on the rear wheel, based on the target pitch moment $M_y$, when the vehicle is decelerated. To each of these forces is added a downward each wheel vertical force $F_{zija2}$ based on the corrective heave force $F_z\_A$ when the vehicle is accelerated and decelerated.

Thus, for example, when the vehicle is decelerated in FIG. 8A, the each wheel vertical force $F_{zFLa1}$ of the front left wheel and the each wheel vertical force $F_{zFRa1}$ of the front right wheel each decrease due to the correction. Therefore, the force that suppresses the contraction of the absorber of each of the front left wheel and the front right wheel, that is the damping force, is decreased due to the correction, and the front side of the vehicle sinks more than before the correction.

The each wheel vertical force $F_{zRLa1}$ of the rear left wheel and the each wheel vertical force $F_{zRRa1}$ of the rear right wheel each increase due to the correction. Therefore, the force that suppresses the expansion of the absorber of each of the rear left wheel and the rear right wheel, that is the damping force, is increased due to the correction, and the rear side of the vehicle sinks more than before the correction.

Thus, when the vehicle is decelerated, due to the correction, the vehicle sinks overall and performs the pitch motion. Sinking of the vehicle when the vehicle is decelerated can give an occupant a sense of security. Also, when the vehicle is decelerated, the transitional position of the pitch rotation axis moves to the rear side of the vehicle from the position before the correction. Depending on the magnitude of the second value α2, an amount by which the vehicle sinks can be changed.

Similarly, when the vehicle is accelerated in FIG. 8B, the each wheel vertical force $F_{zFLa1}$ of the front left wheel and the each wheel vertical force $F_{zFRa1}$ of the front right wheel each decrease by the upward each wheel vertical force $F_{zija2}$ based on the corrective heave force $F_z\_A$ when the vehicle is accelerated and decelerated being added due to the correction. Therefore, the force that suppresses the expansion of the absorber of each of the front left wheel and the front right wheel, that is the damping force, is decreased due to the correction, and the front side of the vehicle is lifted more than before the correction.

The each wheel vertical force $F_{zRLa1}$ of the rear left wheel and the each wheel vertical force $F_{zRRa1}$ of the rear right wheel each increase by the upward each wheel vertical force $F_{zija2}$ being added due to the correction. Therefore, the force that suppresses the contraction of the absorber of each of the rear left wheel and the rear right wheel, that is the damping force, is increased due to the correction, and the rear side of the vehicle is lifted more than before the correction.

Thus, when the vehicle is accelerated, due to the correction, the vehicle is lifted overall and performs the pitch motion. Also, when the vehicle is accelerated, the transitional position of the pitch rotation axis moves to the front side of the vehicle from the position before the correction. Depending on the magnitude of the first value α1, an amount by which the vehicle is lifted can be changed.

Also, by changing the sign of the second value α2 from the above example, due to the correction, the vehicle is lifted overall and performs the pitch motion, when the vehicle is decelerated. By changing the sign of the first value α1 from the above example, due to the correction, the vehicle sinks overall and performs the pitch motion, when the vehicle is accelerated. Therefore, when designing the vehicle, it is possible to adjust whether to lift the vehicle or to sink the vehicle while performing the pitch motion when the vehicle is accelerated and when the vehicle is decelerated. That is, the heave motion due to coupling can be emphasized or can be suppressed. In addition, it is possible to adjust the transitional position of the pitch rotation axis when the vehicle is accelerated and when the vehicle is decelerated.

Thus, by setting the third gain α to the first value α1 when the vehicle is accelerated and setting the third gain α to the second value α2 when the vehicle is decelerated, the vehicle posture can be controlled to be different when the vehicle is accelerated and when the vehicle is decelerated.

Figure 9A:
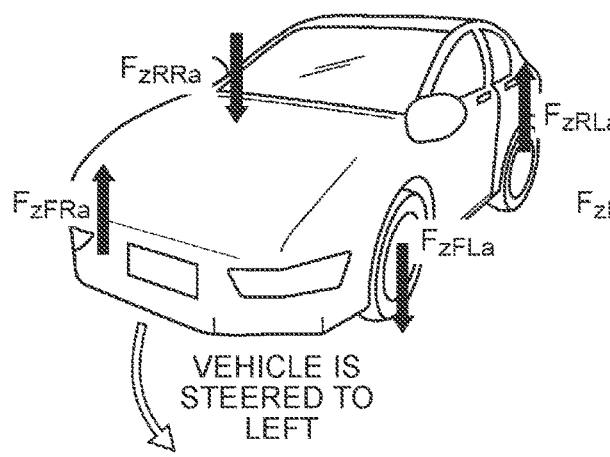
FIG. 9A is a diagram for illustrating the each wheel vertical force that is calculated from a target warp moment when the vehicle is steered.
Figure 9B:
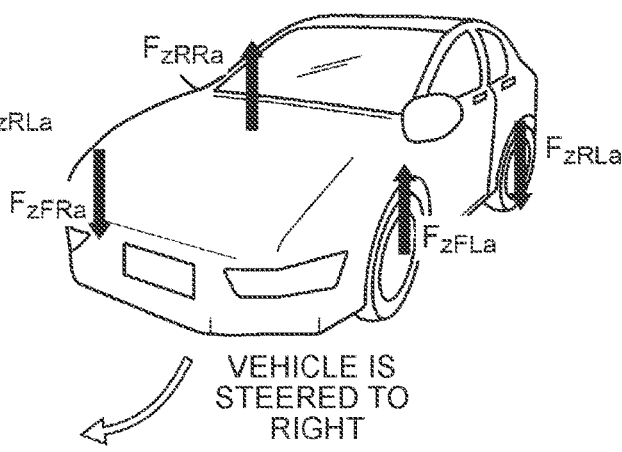
FIG. 9B is a diagram for illustrating the each wheel vertical force that is calculated from the target warp moment when the vehicle is steered.

FIG. 9A and FIG. 9B are each a diagram for illustrating the each wheel vertical force $F_{zija}$ calculated from the target warp moment $M_w$ when the vehicle is steered. FIG. 9A shows the each wheel vertical force $F_{zija}$ when the vehicle is steered to the left, and FIG. 9B shows the each wheel vertical force $F_{zija}$ when the vehicle is steered to the right.

In this example, the fourth gain C is assumed to be a positive value. When the vehicle is steered to the left, the target roll moment $M_x$ is assumed to be a negative value, and when the vehicle is steered to the right, the target roll moment $M_x$ is assumed to be a positive value. Therefore, when the vehicle is steered to the left, the target warp moment $M_w$ that is the product of the target roll moment $M_x$ and the fourth gain C, is a negative value. As a result, from the formulae (5) to (8), as shown in FIG. 9A, the each wheel vertical force $F_{zFLa}$ of the front left wheel is a downward force, the each wheel vertical force $F_{zFRa}$ of the front right wheel is an upward force, the each wheel vertical force $F_{zRLa}$ of the rear left wheel is an upward force, and the each wheel vertical force $F_{zRRa}$ of the rear right wheel is a downward force.

As described above, when the vehicle is steered, the upward each wheel vertical force $F_{zija}$ is generated on the outer wheel during turning, and the downward each wheel vertical force $F_{zija}$ is generated on the inner wheel during turning, based on the target roll moment $M_x$ (FIG. 3A, FIG. 3B). The each wheel vertical forces $F_{zija}$ shown in FIG. 9A and FIG. 9B are added to these forces.

Thus, for example, when the vehicle is steered to the left, the each wheel vertical force $F_{zFLa}$ of the front left wheel in FIG. 3A increases due to the correction. Therefore, the force that suppresses the expansion of the absorber of the front left wheel, that is the damping force, is increased due to the correction, and the front left side of the vehicle sinks more than before the correction.

The each wheel vertical force $F_{zFRa}$ of the front right wheel in FIG. 3A increases due to the correction. Therefore, the force that suppresses the contraction of the absorber of the front right wheel, that is, the damping force, is increased due to the correction, and the front right side of the vehicle is lifted more than before the correction.

The each wheel vertical force $F_{zRLa}$ of the rear left wheel in FIG. 3A decreases due to the correction. Therefore, the force that suppresses the expansion of the absorber of the rear left wheel, that is, the damping force, is decreased due to the correction, and the rear left side of the vehicle is lifted more than before the correction.

The each wheel vertical force $F_{zRRa}$ of the rear right wheel in FIG. 3A decreases due to the correction. Therefore, the force that suppresses the contraction of the absorber of the rear right wheel, that is, the damping force, is decreased due to the correction, and the rear right side of the vehicle sinks more than before the correction.

The same control is performed when the vehicle is steered to the right. When the vehicle is steered to the right, the target warp moment $M_w$ is a positive value. As a result, from the formulae (5) to (8), as shown in FIG. 9B, the each wheel vertical force $F_{zFLa}$ of the front left wheel is an upward force, the each wheel vertical force $F_{zFRa}$ of the front right wheel is a downward force, the each wheel vertical force $F_{zRLa}$ of the rear left wheel is a downward force, and the each wheel vertical force $F_{zRRa}$ of the rear right wheel is an upward force.

Thus, due to the correction, the damping on the front wheel side increases and the damping on the rear wheel side decreases. That is, roll damping can be distributed to the front side. When the fourth gain C is a negative value, due to the correction, the damping decreases on the front wheel side and the damping increases on the rear wheel side. That is, the roll damping can be distributed to the rear side. Therefore, the front and rear distribution ratio of the damping when the vehicle is steered can be adjusted. Also, by setting the fourth gain C in accordance with the vehicle speed, the vehicle posture can be appropriately controlled in accordance with the vehicle speed. The pitch posture and the heave posture are affected by the steering axial force and damping force characteristics.

With such a configuration, for example, even when coupling motion occurs in the pitch and the heave due to the coupling term in the frame of the broken line in the formula (1) as a result of performing the roll control, it is possible to suppress unintended coupling motion while realizing target roll characteristics due to correction by the corrective pitch moment $M_y\_S$ when the vehicle is steered and the corrective heave force $F_z\_S$ when the vehicle is steered that are to suppress the coupling motion. Alternatively, the pitch and the heave when the vehicle is steered and the heave when the vehicle is accelerated and decelerated can be increased to desired magnitudes. Therefore, the vehicle posture close to the target posture can be realized.

In addition, simplification of parameter tuning by an actual vehicle can be realized by two steps of the correction of the vehicle motion and conversion to the each wheel vertical force. Since the gain that is a tuning parameter, and the vehicle posture are shown as a one-to-one relationship, the vehicle posture with respect to the driver's operation can be easily adjusted.

Next, referring to FIGS. 10A, 10B, and 10C to FIGS. 13A, 13B, and 13C, the result of an actual vehicle test using a vehicle equipped with the suspension control system 1 and a vehicle equipped with a suspension control system of a comparative example are described. In the actual vehicle test, 0.5 Hz sine steering is performed at a vehicle speed of 80 km/h. The suspension control system of the comparative example does not include the correction unit 14 and the warp moment calculation unit 16 shown in FIG. 2. The target roll moment $M_x$, the target pitch moment $M_y$, and the target heave force $F_z$ are input to the vertical force calculation unit 32 without being corrected, and the target warp moment $M_w$ is fixed at zero.

Correction of Pitch Component

Figure 10A:
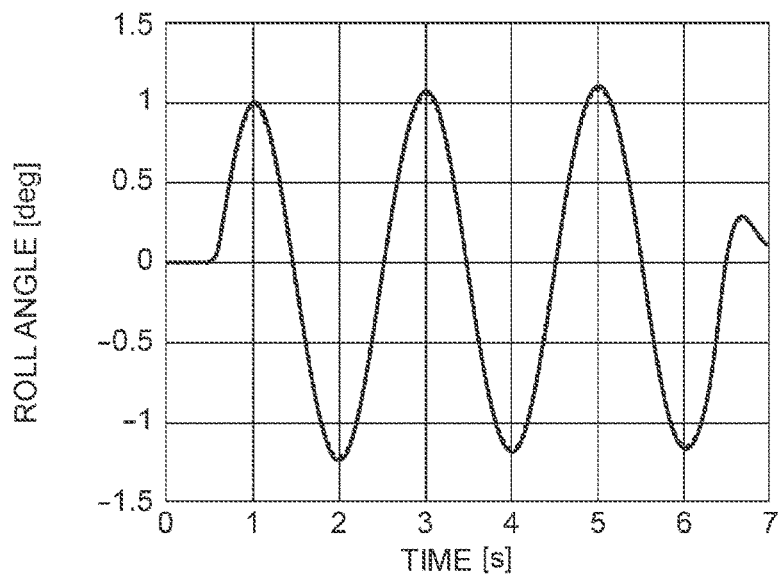
FIG. 10A is a diagram showing vehicle behavior when four-wheel damping is distributed in a forward tilting pitch direction.
Figure 10B:
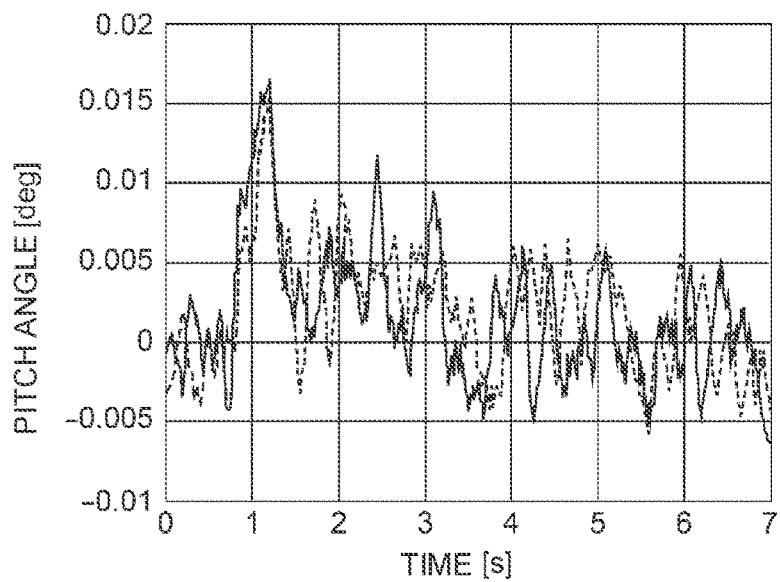
FIG. 10B is a diagram showing the vehicle behavior when the four-wheel damping is distributed in the forward tilting pitch direction.
Figure 10C:
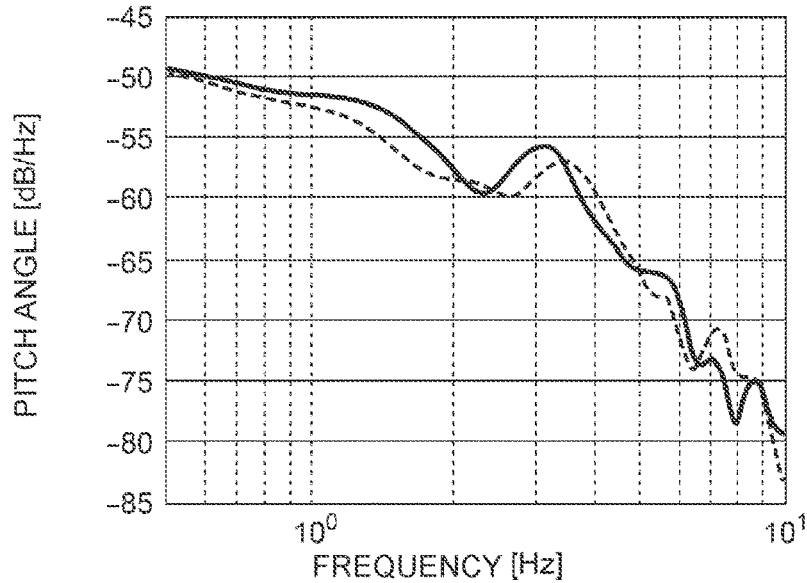
FIG. 10C is a diagram showing the vehicle behavior when the four-wheel damping is distributed in the forward tilting pitch direction.

FIGS. 10A, 10B, and 10C each show vehicle behavior when the four-wheel damping is distributed in the forward tilting pitch direction. That is, the correction using the first gain A that is shown in FIGS. 6A and 6B is performed. FIG. 10A shows the relationship between a roll angle and time. FIG. 10B shows the relationship between a pitch angle and time. FIG. 10C shows the relationship between the power spectrum of the pitch angle and frequency. In FIGS. 10A, 10B, and 10C to FIGS. 13A, 13B, and 13C, solid-line waveforms indicate the embodiment, and dashed-line waveforms indicate the comparative example.

In the embodiment, compared with the comparative example, in the time waveform of the pitch angle in FIG. 10B, a forward tilting pitch tendency is exhibited especially from about 0.5 seconds to about 1.0 second at an early phase of steering. Also in the frequency waveform of the pitch angle in FIG. 10C, the pitch around 1 Hz is emphasized.

Further, as shown in FIG. 10A, there is no change in roll motion between the embodiment and the comparative example, so it can be confirmed that, in the embodiment, the pitch motion during steering is changed, without changing the target roll damping.

In this example, the pitch motion is larger than in the comparative example, but as described above, by adjusting the first gain A, it is possible to suppress the pitch motion caused by coupling.

Correction of Heave Component

Figure 11A:
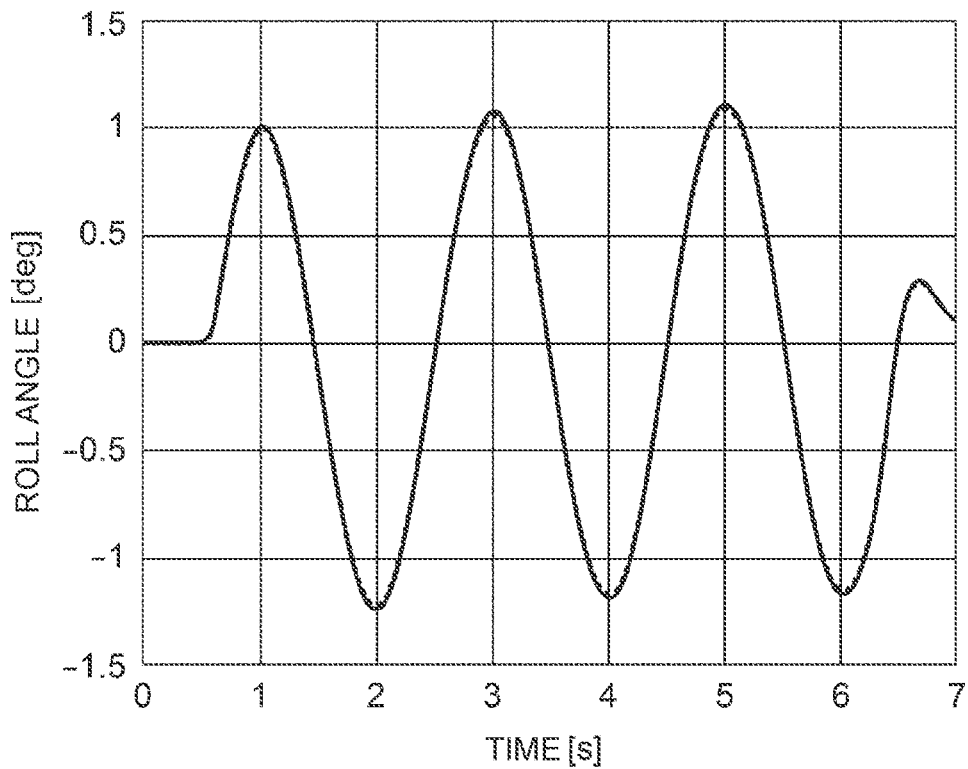
FIG. 11A is a diagram showing vehicle behavior when a damping force is distributed in such a manner that a force acts downward.
Figure 11B:
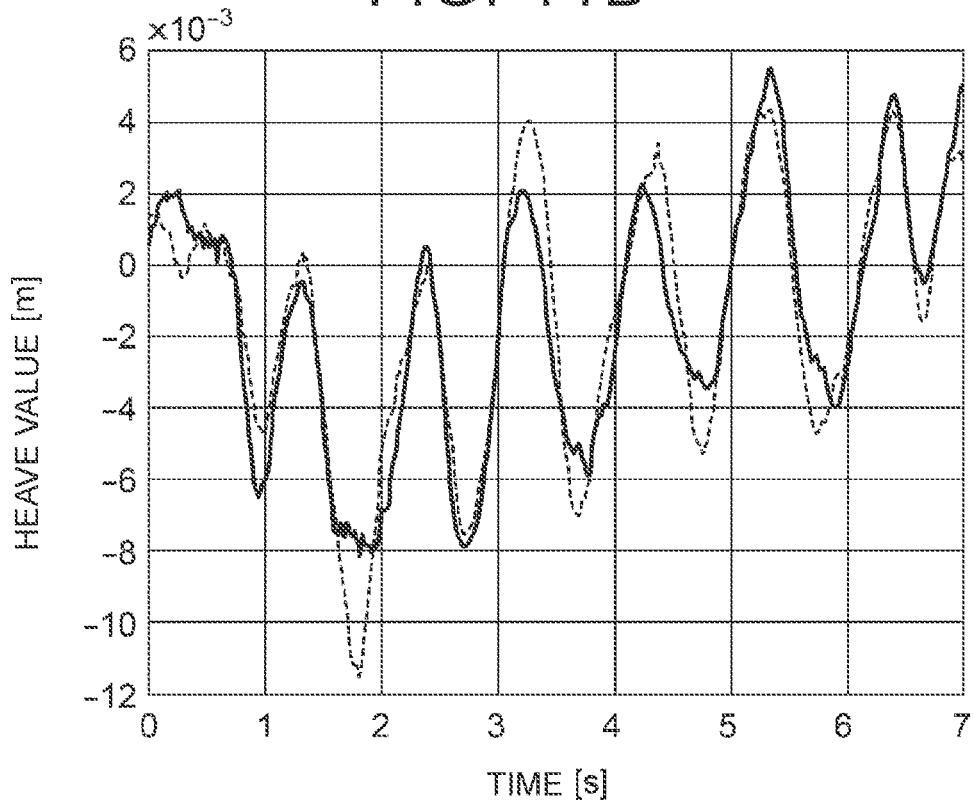
FIG. 11B is a diagram showing the vehicle behavior when the damping force is distributed in such a manner that the force acts downward.

FIG. 11A and FIG. 11B are each a diagram showing the vehicle behavior when the damping force is distributed in such a manner that a force acts downward. That is, the correction using the second gain B that is shown in FIG. 7A and FIG. 7B is performed. FIG. 11A shows the relationship between the roll angle and time, and FIG. 11B shows the relationship between the heave value and time.

Figure 12A:
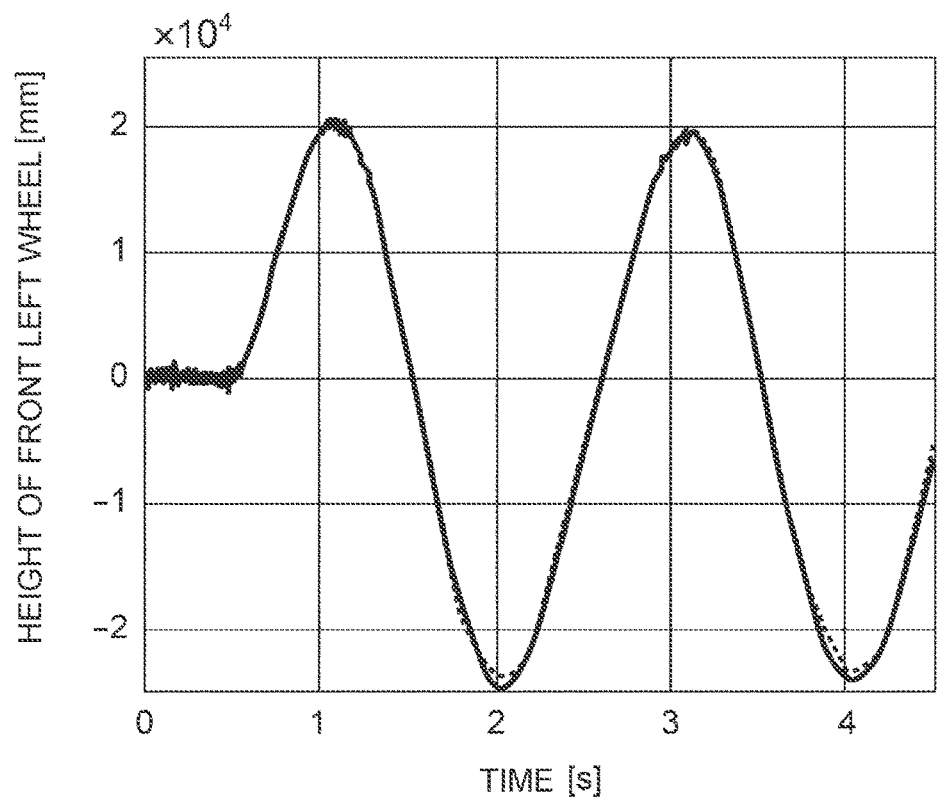
FIG. 12A is a diagram showing an up-down displacement of a front left wheel when the damping force is distributed in such a manner that the force acts downward.
Figure 12B:
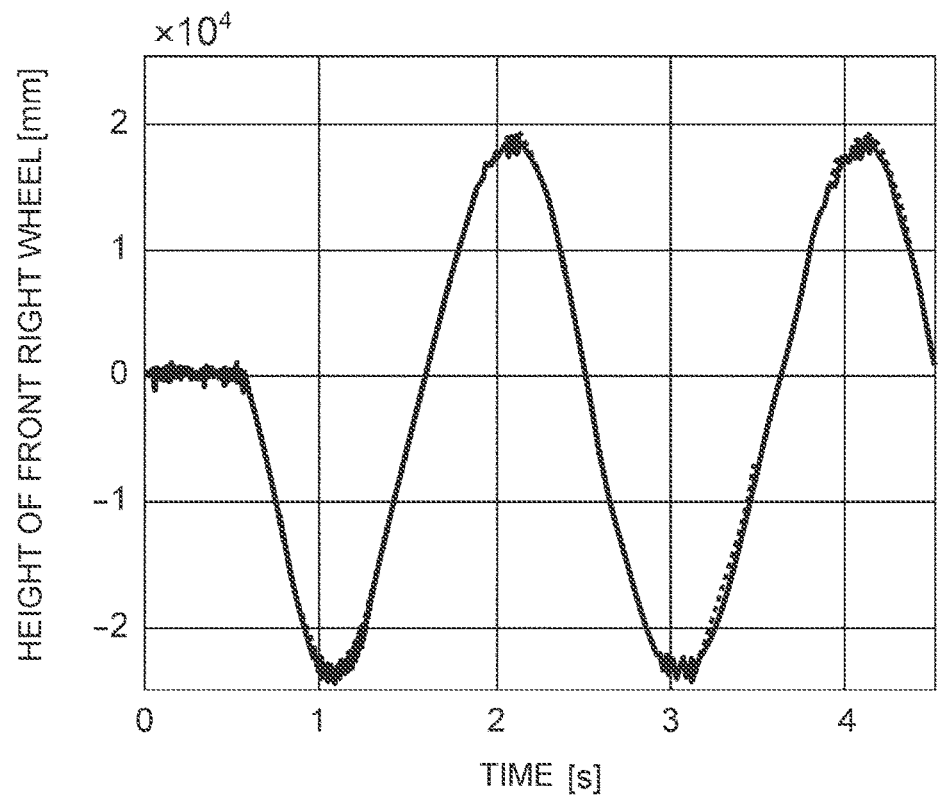
FIG. 12B is a diagram showing an up-down displacement of a front right wheel when the damping force is distributed in such a manner that the force acts downward.

FIG. 12A and FIG. 12B are each a diagram showing an up-down displacement of the front left wheel or the front right wheel when the damping force is distributed in such a manner that the force acts downward. FIG. 12A shows the relationship between the height of the front left wheel and time, and FIG. 12B shows the relationship between the height of the front right wheel and time.

When the damping force is distributed in such a manner that the force acts in a heave vertically downward direction, and the sinking amount of each wheel is confirmed, the sinking tendency when the vehicle is turned is realized as shown in FIG. 12A and FIG. 12B. In FIG. 12A, the front left wheel sinks at around two seconds and four seconds, and in FIG. 12B, the front right wheel sinks at around one second and three seconds. When the time waveforms of the heave shown in FIG. 11A and FIG. 11B are checked based on this, the heave tends to be downward at around two seconds and four seconds that are the time around the roll peak, and the roll is corrected by the heave force.

In this example, the heave motion is larger than in the comparative example, but as described above, by adjusting the second gain B, it is possible to suppress the heave motion caused by coupling.

Correction of Warp Component

Figure 13A:
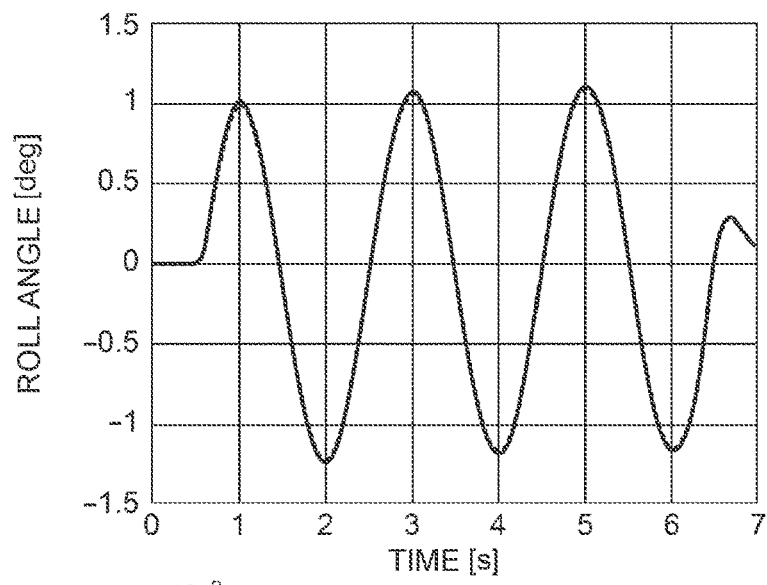
FIG. 13A is a diagram showing vehicle behavior when roll damping is distributed forward.
Figure 13B:
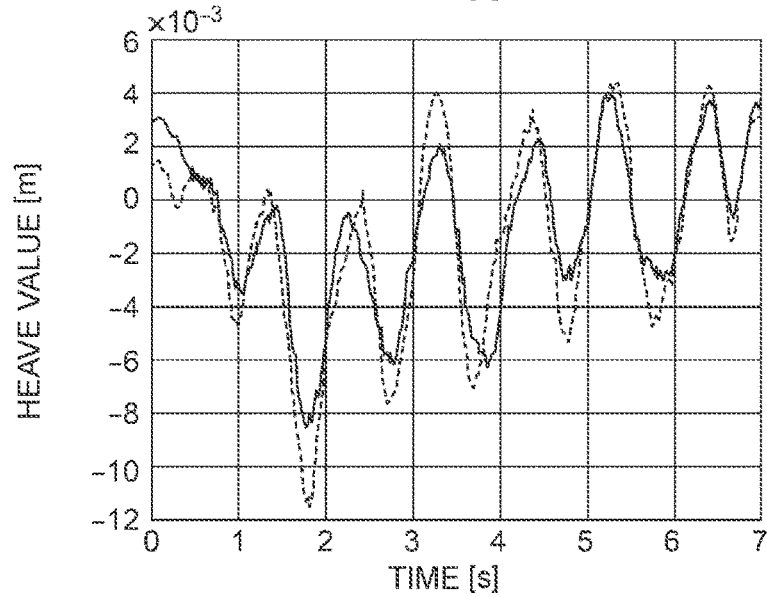
FIG. 13B is a diagram showing the vehicle behavior when the roll damping is distributed forward.
Figure 13C:
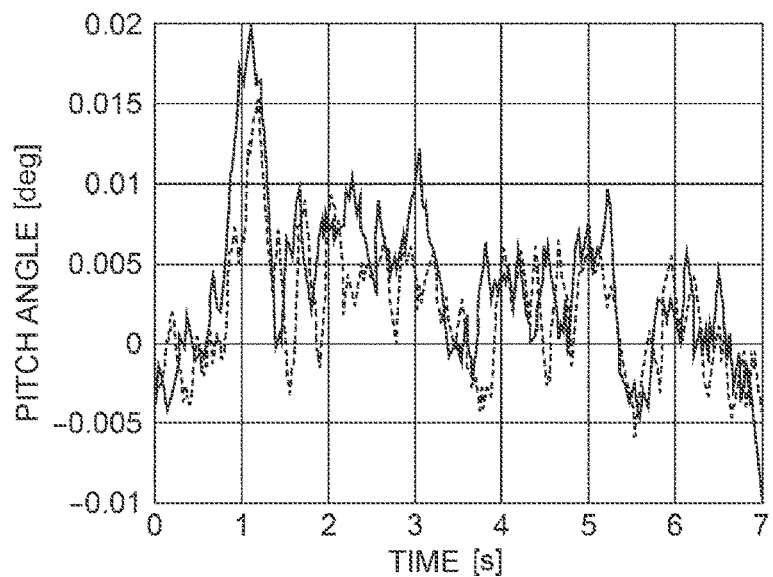
FIG. 13C is a diagram showing the vehicle behavior when the roll damping is distributed forward.

FIGS. 13A, 13B, and 13C each show the vehicle behavior when the roll damping is distributed to the front side. That is, the correction using the fourth gain C that is shown in FIGS. 9A and 9B is performed. FIG. 13A shows the relationship between the roll angle and time. FIG. 13B shows the relationship between the heave value and time. FIG. 13C shows the relationship between the pitch angle and time.

When using a warp command for vertical force distribution in vehicle posture control using the damping force, as can be seen from the formula of coupling from the roll to the pitch moment of the following formula (9), by distributing the roll damping to the front side, $C_{f\!f}-C_{f\!r}$ increases, and the forward tilting pitch tendency becomes stronger.

$$M_{y\phi}=(\tfrac{1}{2}l_f t_f(C_{f\!f}-C_{f\!r})-\tfrac{1}{2}l_r t_r(C_{r\!f}-C_{r\!r}))\phi \qquad \text{Formula (9)}$$

Heave perturbation is reduced by the front and rear distribution of the roll damping being performed to the front side, and the pitch tends to tilt forward. By actively using the damping force expansion compression characteristics of the absorber for sprung posture control, the desired vehicle posture can be realized.

The forward tilting pitch effect has the same tendency as the example in FIGS. 10A, 10B, and 10C. However, the realization method is different. In the example of FIGS. 10A, 10B, and 10C, the pitch moment is directly output, and in the example of FIGS. 13A, 13B, and 13C, the pitch posture is indirectly created by using the damping force expansion compression characteristics. In addition to the sprung posture, the front and rear distribution of the roll damping is directly linked to the steering feel and transitional vertical load distribution between the front and rear wheels, and affects the sensory performance when the vehicle is steered.

From the above test result, it was confirmed that the vehicle posture during steering can be intuitively adjusted with the suspension control device 10 according to the embodiment.

The present disclosure has been described above based on the embodiment. It should be understood by those skilled in the art that the embodiment is merely an example, and that various modifications are possible in combination of each component and each process, and that such modifications are within the scope of the present disclosure.

What is claimed is:

1. A suspension control device comprising:
    an acquisition unit configured to acquire a target roll moment, a target pitch moment, and a target heave force that are calculated based on a vehicle motion model;
    a correction unit configured to correct the acquired target pitch moment based on the acquired target roll moment, and correct the acquired target heave force based on the acquired target roll moment and the acquired target pitch moment;
    a calculation unit configured to calculate a target warp moment based on the acquired target roll moment; and
    a control unit configured to control a damping force of a suspension of a vehicle, based on the acquired target roll moment, the corrected target pitch moment that is corrected by the correction unit, the corrected target heave force that is corrected by the correction unit, and the calculated target warp moment.

2. The suspension control device according to claim 1, wherein:
    the correction unit
        outputs a value obtained by adding a value obtained by multiplying an absolute value of the acquired target roll moment by a first gain, and the acquired target pitch moment, as the corrected target pitch moment, and
        outputs a value obtained by adding a value obtained by multiplying the absolute value of the acquired target roll moment by a second gain, a value obtained by multiplying the acquired target pitch moment by a third gain, and the acquired target heave force, as the corrected target heave force; and
    the calculation unit outputs a value obtained by multiplying the acquired target roll moment by a fourth gain, as the target warp moment.

3. The suspension control device according to claim 2, wherein:
    the acquisition unit acquires a vehicle speed of the vehicle;
    the correction unit sets the first gain and the second gain in accordance with the vehicle speed; and
    the calculation unit sets the fourth gain in accordance with the vehicle speed.

4. The suspension control device according to claim 2, wherein the correction unit sets the third gain to a first value when the acquired target pitch moment is positive, and sets the third gain to a second value when the acquired target pitch moment is negative.

5. The suspension control device according to claim 2, wherein a sign of the second gain is determined in advance such that a value obtained by multiplying the absolute value of the acquired target roll moment by the second gain represents a downward force of the vehicle.

* * * * *